US006945372B2

(12) United States Patent
Antonovsky (10) Patent No.: US 6,945,372 B2
(45) Date of Patent: *Sep. 20, 2005

(54) HIGH FREQUENCY SHOCK ABSORBER AND ACCELERATOR

(76) Inventor: Yevgeny Antonovsky, 2676 W. 3$^{rd}$ St., Brooklyn, NY (US) 11223

( * ) Notice: Subject to any disclaimer, the term of this patent is extended or adjusted under 35 U.S.C. 154(b) by 0 days.

This patent is subject to a terminal disclaimer.

(21) Appl. No.: 10/670,994

(22) Filed: Sep. 24, 2003

(65) Prior Publication Data

US 2005/0062206 A1 Mar. 24, 2005

Related U.S. Application Data

(60) Continuation-in-part of application No. 10/224,056, filed on Aug. 20, 2002, now Pat. No. 6,612,410, which is a division of application No. 09/978,938, filed on Oct. 17, 2001, now Pat. No. 6,454,061.

(51) Int. Cl.$^7$ .................................................. F16F 9/48
(52) U.S. Cl. ........................ 188/280; 188/284; 188/286; 267/64.11; 267/124; 267/226
(58) Field of Search ........................... 267/64.11–64.28, 267/124, 113, 226, 139; 16/66, 84; 188/284, 286, 280, 322.14; 92/163; 91/25

(56) References Cited

U.S. PATENT DOCUMENTS 6,454,061 B1 * 9/2002 Antonovsky ................. 188/280
6,612,410 B1 * 9/2003 Antonovsky ................. 188/280

* cited by examiner

*Primary Examiner*—Douglas C. Butler
(74) *Attorney, Agent, or Firm*—Steven Horowitz (57) ABSTRACT

A powerful high frequency shock absorber/accelerator uses compressed air but maintains a substantially uniform level of force throughout retraction and extension strokes. A piston moving in an inner chamber compresses gas in the chamber. Initially, an aperture allows compressed gas to be pushed to an outer storage chamber surrounding the inner chamber. As the piston moves further, sealing structure seals gas coming through the aperture thereby isolating the compressed air in the outer chamber from the inner chamber. At the end of the retraction stroke the small amount of remaining air is vented to outside and the piston faces a small counterforce-generating member. When the extension stroke is initiated the counterforce-generating member moves the piston a small distance until the seal is broken. The force of the compressed air rushing back into the inner chamber drives the extension stroke. Additional embodiments include replacing outer chamber with external source of gas.

13 Claims, 10 Drawing Sheets

HIGH FREQUENCY SHOCK ABSORBER AND ACCELERATOR

This patent application is filed pursuant to 37 CFR 1.53(b) as a continuation-in-part of application Ser. No. 10/224,056 filed Aug. 20, 2002, now U.S. Pat. No. 6,612,410 issued Sept. 2, 2003, which is a divisional patent application of U.S. patent application Ser. No. 09/978,938, which was filed on Oct. 17, 2001 now U.S. Pat. No. 6,454,061 B1 issued on Sep. 24, 2002.

BACKGROUND OF THE INVENTION AND DISCUSSION OF THE PRIOR ART

The automation of machinery for mass production and for "old economy" industrial functions is very well known. Shock absorbers and accelerators are needed in many settings where machine parts move repeatedly in a reciprocating or other repeated motion.

Various industrial shock absorbers and acceleration devices are known in the art. For example, standard shock absorbers employ a liquid such as a special oil being forced through a comparatively small orifice to progressively diminish the force being absorbed The primary drawback of such hydraulic shock absorbers is the fact that significant heat dissipation results when the oil is forced through the orifice and the kinetic energy of the piston is brought to zero. The kinetic energy is transformed into heat energy. As a result, the system loses the ability to re-use that energy that has been transformed into heat. Also, the possibility of system overheating greatly reduces the applicability of these shock absorbers at high frequencies. On the other hand, the advantage of using oil-based hydraulic shock absorbers is that they are very powerful since oil is virtually non-compressible. With use of oil-based shock absorbers, a uniform force can be maintained throughout the stroke. Since work is proportional to force and distance, this maximizes the power of the shock absorber.

Another standard type of industrial shock absorber is pneumatic, wherein air or another gas is forced through a small orifice. This avoids the disadvantage of oil-based hydraulic shock absorbers because there is significantly less heat dissipation from air than oil. This does not provide a very powerful type of shock absorber since air is compressible and hence the force maintained through the stroke decreases more and more as the stroke progresses.

Air can also be used differently as when the air acts as a spring. The disadvantage of an air spring is that there is likely to be a strong return force or bounce-back effect unless a lock or other separate mechanism is employed to hold the spring in place at the end of the retraction stroke. The lock would also have to be controlled by an electric or other mechanism that releases the lock when desired. Any such separate mechanism of a lock and control structure adds significantly to the expense and complexity of the device. Even with the lock and control mechanism, the device still is saddled with a meaningful return force.

Shock absorbing effect can also be achieved by using a helical or other mechanical spring. But for a helical spring to be powerful it would have to be very large and then the lock would have to be large and a special release mechanism for the lock would be required. All that adds to the expense and complexity of the device. Moreover, the force applied by a helical spring is not uniform and decreases as the stroke unfolds which reduces the amount of absorbed energy. More energy could be absorbed by a shock absorber that has a uniform force throughout the stroke. A lot more energy can be stored with air than with a helical spring in the same given amount of space. Finally, all shock absorbers with locks, for example springs, are not sufficiently safe because there always exists the danger than the lock or other mechanism for holding the spring in the compressed state will fail.

Another problem in shock absorbers is maintaining a sufficiently low return force. If the return force is too great then equipment may be damaged and energy is wasted. Accordingly, depending upon the size of the shock absorber, there is a maximum acceptable return force for that shock absorber.

A shock absorber that is powerful although not quite as powerful as oil-based shock absorbers, is safe, significantly less expensive to use in that it saves a lot of energy, has a low return force and does not incur significant heat dissipation would represent a significant advance in the art. In particular, industrial shock absorber that are suitable for high cycling frequency applications with low or medium inch-pounds per cycle but with high inch-pounds per hour could benefit greatly from a shock absorber that has the above characteristics.

If such a shock absorber were also able to function as an acceleration device, it would be remarkably valuable. In general, industrial equipment not only use shock absorbers to absorb the energy during the retraction stroke but also employ a separate accelerator or actuator to move the machine part in the reverse direction. This use of separate equipment is expensive. A large cost savings could be achieved if a single device could be employed as both a shock absorber and as an accelerator. Tremendous energy savings could be achieved by recycling energy used during the shock absorption and re-used for acceleration, much lower propelling force would be needed, a lower return force could be achieved, heavier weight could be moved at high cycling frequency and a higher cycling frequency could be achieved. The present invention achieves these and many other advantages.

SUMMARY OF THE PRESENT INVENTION

A powerful adjustable high frequency shock absorber and accelerator for low or medium inch-pounds per cycle but with high inch-pounds per hour uses compressed air but maintains a substantially uniform level of force throughout the retraction and extension strokes. A piston moves in an inner chamber and compresses air located in the chamber. Initially, an aperture allows compressed air to be forced into an outer storage chamber surrounding the inner chamber. As the piston moves further, the sealing structure on the piston, such as several o-rings or other sealing structure, seals flow of gas coming through the aperture thereby isolating the compressed air in the outer storage chamber from the inner chamber. Since the compressed air or other gas contains the stored energy generated from the retraction stroke, this energy can later be used to drive the extension stroke in the reverse direction. After sealing is accomplished the piston moves further in the inner chamber to complete the retraction stroke. At the end of the retraction stroke the small amount of remaining air—and any air that leaked in in the event of a mishap—is vented to the outside and the piston faces a small counterforce-generating member. When the extension stroke is initiated at a preset time interval the counterforce-generating member moves the piston a small distance until the sealing structure no longer off air coming through the aperture. The force of the compressed air rushing back into the inner chamber drives the extension stroke.

OBJECTS AND ADVANTAGES

The following important objects and advantages of the present invention are:

(1) to provide a shock absorber that uses compression of air which allows much greater storage of energy than a spring;

(2) to provide a shock absorber and accelerator using compressed air that achieves substantially uniform force throughout the retraction stroke and achieves substantially uniform level of force throughout the extension stroke;

(3) to provide a shock absorber and an accelerator in one device;

(4) to provide a shock absorber and accelerator that operates in high cycling frequency applications which have low or medium inch-pounds per cycle though high inch-pounds per hour;

(5) to provide a shock absorber using compressed air that is much more powerful than known pneumatic shock absorbers;

(6) to provide a shock absorber that combines the advantages of oil and air shock absorbers without the disadvantages of such shock absorbers;

(7) to provide a shock absorber that does not suffer from the problem of significant heat dissipation arising from repeated strokes as do standard shock absorbers that use oil or other fluids to absorb kinetic energy;

(8) to provide a shock absorber that has a low return force;

(9) to provide a shock absorber that has a significantly lower return force than standard shock absorbers, namely up to five times less than comparably sized industrial shock absorbers;

(10) to provide a combined shock absorber and accelerator in which the extension stroke (return stroke) occurs automatically with the removal of the weight or other source of the initial kinetic energy;

(11) to provide a shock absorber that provides a large energy savings, in particular up to 85% energy savings compared to comparably sized industrial shock absorbers;

(12) to provide a device that works as a shock absorber for the retraction stroke and as an accelerator for the extension stroke;

(13) to provide a shock absorber that requires a much lower propelling force, in particular up to 18 times less propelling force compared to comparably sized industrial shock absorbers;

(14) to provide a shock absorber that greatly outperforms comparably sized industrial shock absorbers;

(15) to provide a shock absorber that operates at extremely high cycling frequency, in particular up to 15,000 cycles per hour;

(16) to provide a shock absorber that achieves unprecedented high absorbed/released energy capacity, namely up to one billion inch-pounds per hour;

(17) to provide a shock absorber that can handle a heavier moving weight at high cycling frequency than comparably sized industrial shock absorbers;

(18) to provide a shock absorber and accelerator in which the time interval between retraction and extension strokes can be set to any length by the user;

(19) to provide an alternative embodiment of the above shock absorber and accelerator device in which the power of the device can be further significantly multiplied by increasing the diameter of the piston and by neutralizing the concomitant friction that would otherwise result from such increased diameter;

(20) to provide an extra-powerful alternative embodiment that neutralizes friction by means of a ram actuator that is smaller in diameter than the piston and by means of a smaller counterforce-generating member aided by a secondary carefully-timed influx of compressed air through a gas passage from an external gas storage container or from the outside storage chamber to the area of the counterforce-generating member after the counterforce-generating member has begun to move to help the counterforce-generating member move the ram actuator the initial distance;

(21) to provide a shock absorber and accelerator in which the compressed air can be stored in a chamber that is within or alternatively exterior to the device; and (22) to provide a shock absorber and accelerator device that is of simple construction to minimize the cost of manufacture and of maintenance and the expense of use.

DETAILED DESCRIPTION OF THE PREFERRED EMBODIMENTS

Figure 1A:
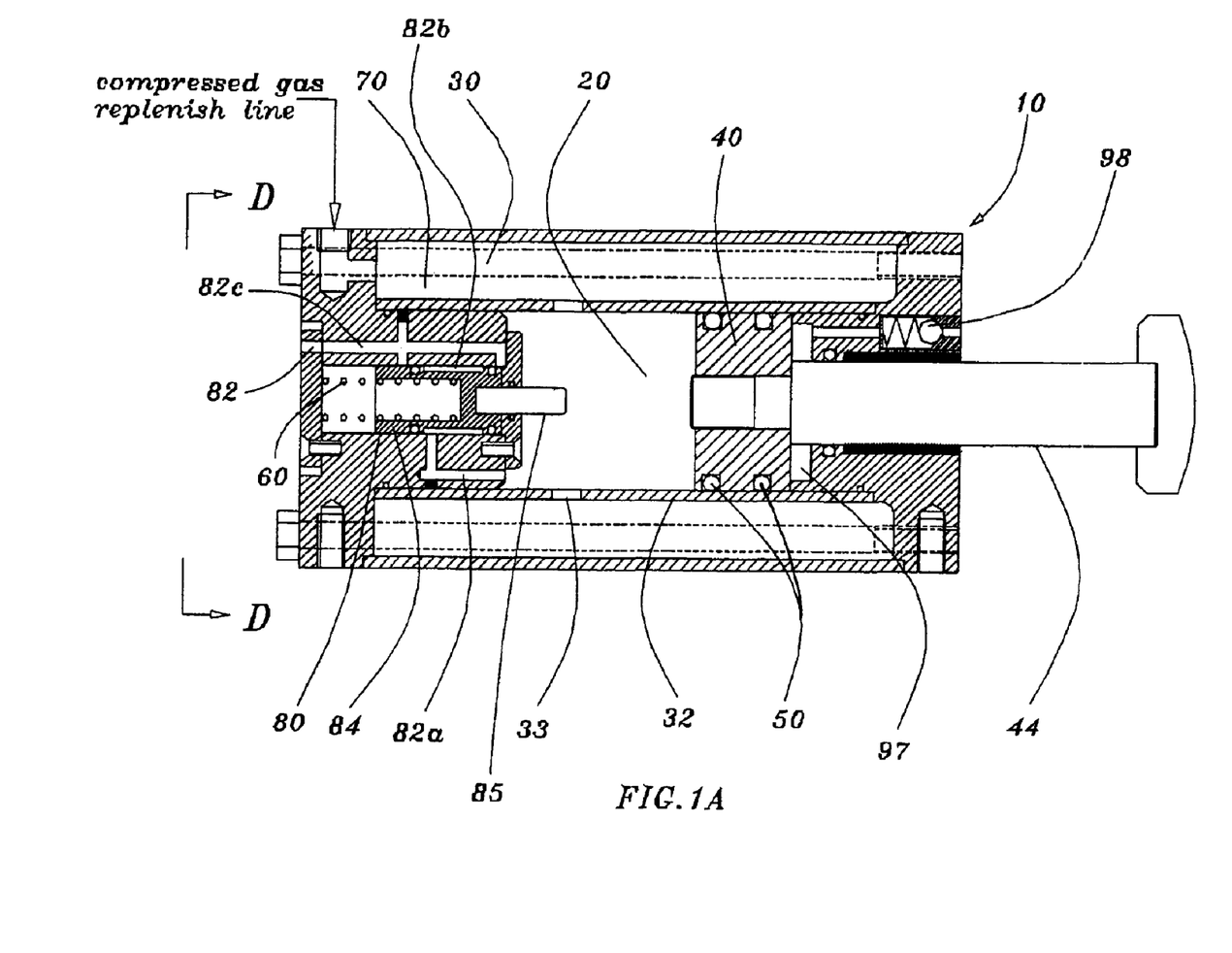
FIG. 1A is a sectional view of the shock absorber/accelerator of the present invention in its initial position.
Figure 1B:
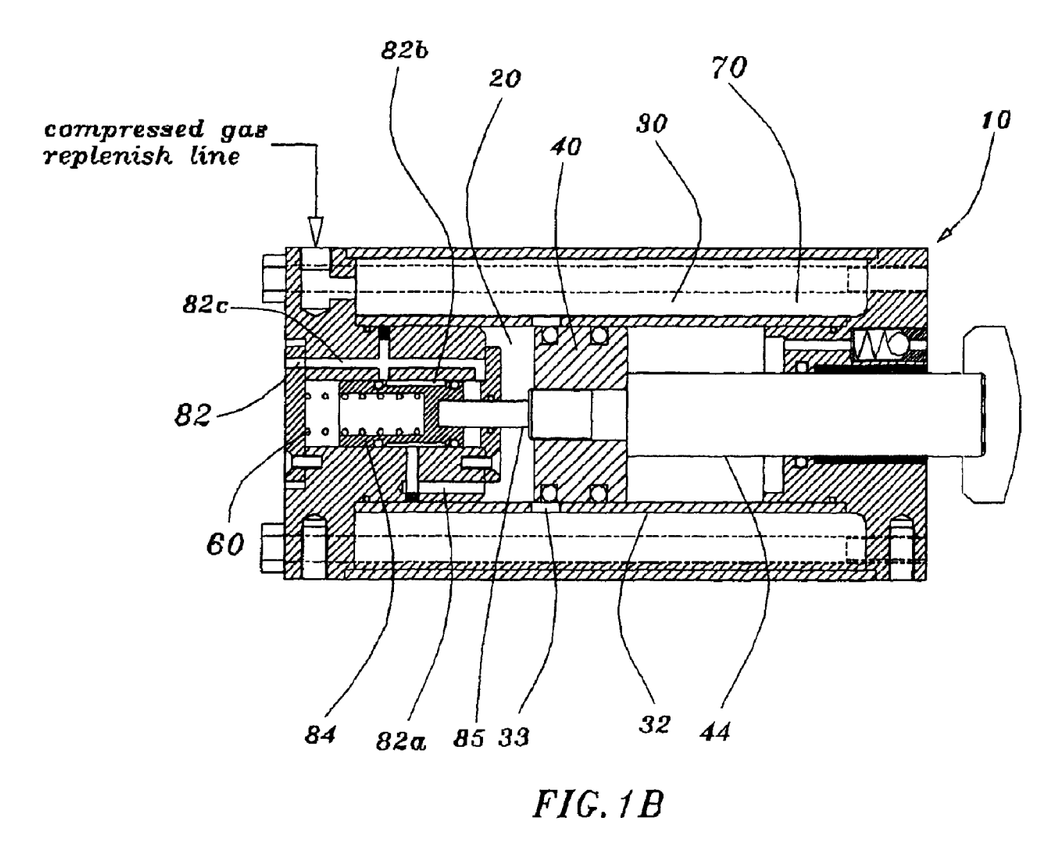
FIG. 1B is a sectional view of the device in its intermediate position.
Figure 1C:
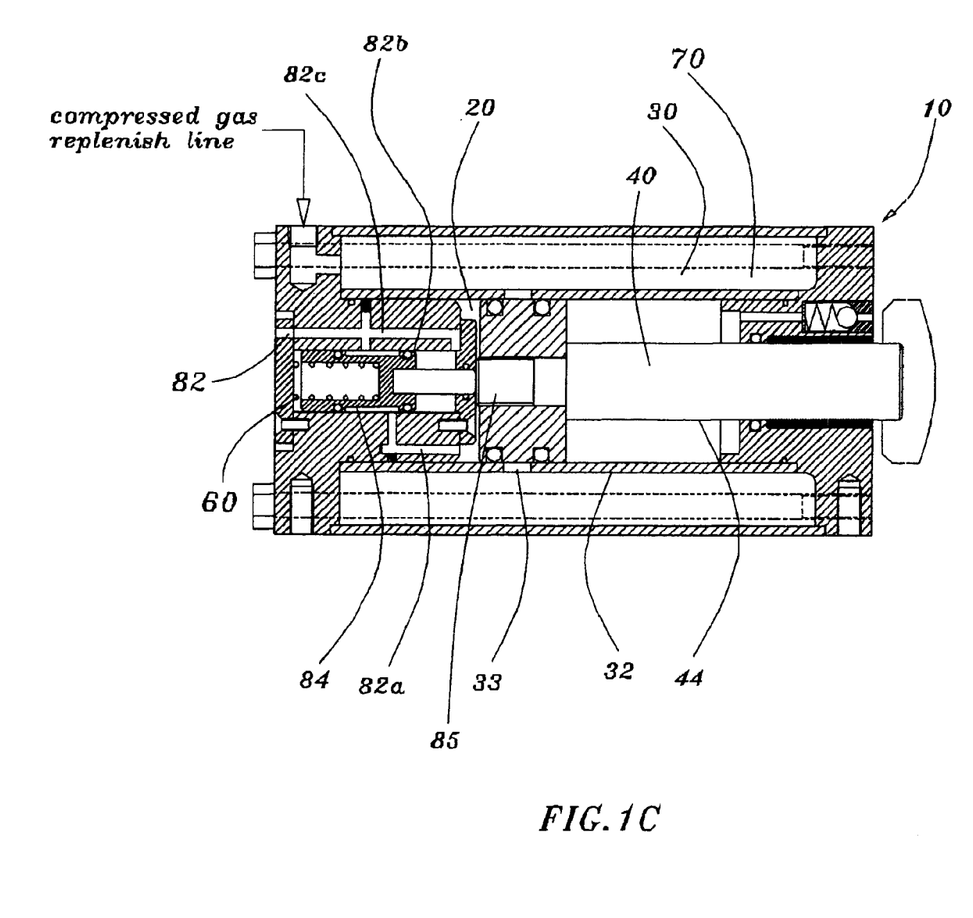
FIG. 1C is a sectional view of the device in its final position in the retraction stroke.

In order to better understand the present invention in conjunction with the drawings of FIGS. 1A through 5, the overall device of the present invention has been assigned reference numeral 10 and its elements are described and assigned the reference numerals identified below. There are essentially four main embodiments, that differ only in certain details with one another. The main embodiment has an outer storage chamber of compressed air inside the device as depicted in FIGS. 1A, 1B and 1C. The alternative embodiment has no outer chamber and has a source of compressed air external to the device as shown in FIG. 2. Another alternative embodiment incorporates modifications to the embodiment of FIG. 2 to create an extra powerful shock absorber an accelerator and shown in FIGS. 3A, 3B and 3C Still another alternative embodiment incorporates the same modifications to the embodiment of FIGS. 1A–1C to create an extra powerful shock absorber and accelerator and shown in FIG. 4. The various embodiments will now be explained including FIG. 1D.

In its preferred embodiment depicted in FIGS. 1A, 1B and 1C, shock absorber/accelerator device 10 is comprised of inner chamber 20, outer storage chamber 30, piston 40, sealing structure 50, counterforce-generating member 60, gas 70 and venting pathway 80. Inner chamber 20 contains a gas such as air or nitrogen. Inner chamber 20 is preferably cylindrical for minimum friction but it may assume other shapes as well. For example, its cross section could be oval, elliptical or substantially rectangular wherein the corners of the rectangle are rounded. It is preferable that the cross-sectional shape of the inner chamber not be one that includes sharp corners since sealing against the flow of gas or air is difficult if the areas that have to be sealed includes sharp corners.

Outer storage chamber 30 may be but need not be coaxial with inner chamber 20. Outer chamber 30 may be although need not be generally of the same shape as the inner chamber 20. Outer chamber 30 contains compressed gas 70. Inner wall 32 defines a boundary between outer storage chamber 30 and inner chamber 20. Inner wall 32 may be part of inner chamber 20, may be part of outer chamber 30 or neither. Inner wall 32 has an aperture 33 defined therein for allowing compressed gas 70, i.e. air, to travel between the two chambers 20, 30, as explained below in detail. Due to aperture 33, at the initiation of the retraction stroke gas 70 in inner chamber 20 is also compressed.

The gas 70 used is preferably air or nitrogen but may be other suitable gases. Air and nitrogen are commonly used but other suitable gases 70 can be used. Whenever the detailed description of the invention in this application refers to air it should be assumed that the same applies to other gases as well. The only exception is the air behind piston 40 that enters device 10 through check valve 98 from outside device 10, as will be explained below. That air is normally air since it enters device 10 from the general atmosphere outside device 10. However, the present invention even contemplates that another gas besides air could also be made to pass through check valve 98 from the outside and enter device 10.

Compressed air is cheaper than compressed nitrogen and so is preferable in that regard. One of the advantages of the device 10 is the significant savings of energy. Compressed air is actually much more expensive than electricity but device 10 makes use of stored energy inherent in the compressed air or gas 70 obtained during the retraction stroke (the shock absorber function of device 10) to drive the extension stroke or acceleration function of device 10 and achieve significant energy cost savings by minimizing the use of fresh compressed air. Device 10 in effect recycles existing compressed air.

It should be noted that the gas 70 that is in the part of inner chamber 20 forward of the piston 40 is the same compressed gas 70 as that in outer chamber 30 but once the retraction stroke progresses the gas behind piston 40 may be air even if compressed gas 70 is something other than air. That is because as the retraction stroke progresses some air enters inner chamber 20 behind piston 40 from outside device 10 passing through check valve 98. As seen in FIGS. 1A, 1B and 1C, check valve 98 located at the rear end of the device 10 is a one way valve to the outside of device 10. Air only goes in to device 10 through this check valve 98 from the outside. At the end of the extension stroke, there would be a bang of metal on metal if device 10 did not include check valve 98 since check valve 98 traps a pillow of air (not any other kind of gas) in recess 97 near the check valve 98. The pillow of air derives from the air (not any other kind of gas) that comes in to device 10 through the check valve 98 from the outside. As an alternative to check valve 98, there could be a plastic or rubber bumper or any other suitable structure for preventing a bang of metal on metal.

Compressed air 70 in outer chamber 30 represents stored energy and that stored energy is controlled by having the compressed air 70 isolated from the inner chamber 20 even prior to completion of the retraction stroke.

Aperture 33 may take a variety of shapes. For example, aperture 33 may consist of one or more ports or may be substantially annular. If aperture is substantially annular, then for structural rigidity and strength, there should preferably be at least two points at which there is a physical interruption in the otherwise substantially annular aperture 33. Aperture 33 should preferably be substantially perpendicular to the length of the device, i.e. to the direction of the retraction stroke, to minimize the force needed to seal the aperture 33 and aperture 33 should be large enough so there is a minimum restriction on the flow of the compressed gas, as explained further below.

In the basic embodiments, piston 40 is attached to piston rod 44. There is a minimal clearance between the piston 40 and inner wall 32 whose purpose is simply to reduce friction that results from constantly moving metal. The clearance may be approximately 0.003 (³⁄₁₀₀₀) or 0.005 (⁵⁄₁₀₀₀) of an inch although the present invention is in no way limited to a device having any particular sized clearance. Although this clearance may be extremely small to the point of being negligible it is large enough to allow the flow of molecules of gas 70. Furthermore, even if there is only a negligible clearance, the lack of perfect smoothness on the surfaces of inner wall 32 and piston 40 is bound to create at least some disturbances in what would otherwise be a perfect fit and hence some compressed gas 70 would pass through to inner chamber 20 if not for sealing structure 50.

Piston 40, upon the exertion of a force well known in the art, such as by a moving weight, against the piston rod 44, moves through inner chamber 20 and compresses air 70 in inner chamber 20 and drives the air 70 through aperture 33 to outer storage chamber 30.

Sealing structure 50 situated on piston is for sealing the flow of gas from the outer chamber 30 into inner chamber 20 and in particular seals the clearance between piston 40 and inner wall 32. Sealing structure 50 includes at least one and preferably two or more annular o-rings. Ideally there should be approximately two such o-rings with one o-ring spaced on each side of aperture 33 when piston 40 faces aperture 33.

Sealing structure 50 need not be o-rings at all. By way of example, sealing structure can be spring-loaded seals 50. Sealing structure 50 can be anything that is sufficiently flexible to effectively seal the clearance between piston 40 and inner wall 32 and thereby seal off compressed gas 70 coming through aperture 33 from outer chamber 30. The present invention contemplates any kind of suitable sealing structure 50. Preferably, this sealing should occur during an intermediate phase of the retraction stroke, as explained below. In the preferred embodiment, sealing structure 50 operates when it blocks the flow of gas 70 coming through aperture 33 into inner chamber 20. Although some entry by the compressed gas 70 into inner chamber 20 beyond aperture 33 is permitted until gas 70 reaches sealing structure 50, such entry of gas 70 is not in a position to drive piston 40. Also, typically, sealing structure 50 is activated simply from the motion of piston 40 moving through inner chamber 20 and in particular is activated when piston 40 reaches aperture 33 and goes sufficiently beyond aperture 33 to effectuate sealing off compressed gas that would enter or that has already begun to enter some portion of inner chamber 20. Sealing structure 50 need not block the flow of compressed gas 70 exactly at the point of aperture 33 since sealing structure 50 typically blocks the clearance between piston 40 and inner wall 32. In the case of o-rings, for example, the flow of gas 70 is blocked beyond the point of each o-ring on each side of aperture 33.

The present invention also contemplates more complicated sealing structure 50 but it should be noted that such more complicated sealing structure 50 add to the complexity and cost of the device 10 and at some point defeat many of the benefits of device 10. For example, the movement of piston 40 could cause the closing of a door across aperture 33 in inner wall 32 (or outer wall 21 of inner chamber 20 with respect to the embodiment disclosed in FIG. 2) at the appropriate time. Sealing by sealing structure 50 may even be triggered by computer, electronic components or other automatic system at the appropriate time, i.e. during an intermediate phase of the retraction stroke and when piston 40 faces aperture 33.

When piston 40 moves through a portion of the inner chamber 20 during an intermediate phase of the retraction stroke, sealing structure 50, i.e., o-rings 50, supported by piston 40 seal the clearance between piston 40 and inner wall 32 thereby blocking gas 70 coming through aperture 33.

Aperture 33 is situated so that additional movement of piston 40 can occur during the retraction stroke after the sealing structure 50 seals the flow of compressed gas 70 off which typically occurs approximately when piston 40 faces aperture 33. Aperture 33 should ideally be situated as close to a point of a completion of the retraction stroke as possible to minimize the length and cost of device 10 while still being situated so that additional movement of piston 40 can occur during the retraction stroke after the sealing by sealing structure 50. In the case of sealing structure 50 being o-rings, then ideally the most forward edge of aperture 33 should be approximately one eighth of an inch behind the first o-ring of sealing structure 50. The term "forward" means toward the forward end of device 10 where spring 60 is located. The present invention, however, is in no way limited to these proposed dimensions.

The fact that aperture 33 is situated so that additional movement of piston 40 can occur after sealing by sealing structure 50 during the retraction stroke operates as an additional safety feature. In other words, since the isolation of the compressed air 70 from the inner chamber 20 does not occur at the end of the retraction stroke, but rather in an intermediate stage of the retraction stroke, in the event that accidental movement of piston 40 for any reason, then there is no force from the stored energy of the compressed air 70 that jerks piston 40 backward. If, by way of contrast, the sealing by sealing structure 50 occurred at the very end of the retraction stroke, which it does not in this device 10, then if an error caused accidental movement of piston 40 and the seal were broken, then any initial movement of piston 40 backward would necessarily allow the compressed air 70 to rush in and dangerously accelerate the piston 40 backward as in an extension stroke without warning using the full force of the compressed air 70 stored in outer chamber 30.

At the end of the retraction stroke piston 40 faces a counterforce-generating member 60. Although a helical spring is shown in the drawings, any counterforce-generating member 60 is contemplated by the present invention. Counterforce-generating member 60 is there in order to move piston 40 an initial distance to initiate an extension stroke in the reverse direction from the direction of piston 40 during the retraction stroke. In general, the initial distance need only be sufficient so that aperture 33 is no longer sealed and compressed air 70 rushes in to inner chamber 20 from outer chamber 30. The initial distance must be sufficient so that sealing structure 50 releases the sealing of aperture 33, i.e. sealing structure 50 no longer seals aperture 33 by sealing off gas 70 coming through aperture 33. Thus, when the extension stroke transpires and piston 40 moves the initial distance and sealing structure 50 no longer seals off gas 70 coming through aperture 33, compressed gas 70 from outer storage chamber 30 rushes in to the inner chamber 20 thereby greatly accelerating piston 40 for the remainder of the extension stroke.

As explained, counterforce-generating member 60 can also be a gas spring. If so, device 10 would include a channel (not shown) between counterforce-generating member 60 and outer chamber 30 or in the embodiment shown in FIG. 2 and FIG. 3A, between counterforce-generating member 60 and external source 90 of compressed air. As explained further below, there would also be valve sealing structure, such as o-rings of valve 84, that would prevent such gas from entering inner chamber 20.

Although device 10 inherently minimizes the return force by isolating the compressed air 70 in outer chamber 30, the return force is not entirely eliminated due to counterforce-generating member 60. The return force generated by counterforce-generating member 60, however, is not large since the diameter of counterforce-generating member 60 and the diameter of valve 84 are small (and since force is proportional to the square of the diameter).

Although the present invention contemplates a device 10 with only those features already described, such a device 10 would have limited applicability since it would not be sufficiently safe and would have a significant return force (i.e. bounce back effect). The device 10 with only these features would only be useful when there exists a large enough force keeping the piston 40 in a fully retracted position. The safety problem derives from the build-up of pressure that would occur at the end of the retraction stroke without venting structure to the outside (the area external to the device 10). Accidental injury is possible to the machine that the device 10 is connected to, to humans working the device 10 or to device 10 itself The same build-up of pressure would also cause a return force that impedes proper operation of the device 10. One of the advantages of the device 10 of the present invention in its preferred embodiment is the fact that it reduces the return force even though the power of the device 10 as a shock absorber and as an accelerator remains greatly enhanced. Accordingly, an additional feature of the preferred embodiment of the present invention will be now be described that eliminates the above-cited safety concerns and return force problems and that makes device 10 suitable for a wider range of applications.

An additional safety feature of the device 10 is venting structure 80 which may include a venting pathway from inner chamber 20 to an area external to device 10 for venting any gas 70 remaining in inner chamber 20 at the completion of the retraction stroke or at a point just prior thereto. This prevents the safety problem and the unacceptably high return force that would derive from pressure being built up in the inner chamber 20. The present invention contemplates any suitable structure for venting compressed gas to an area external to the device 10. Besides being a safety precaution venting structure 80 also vents any gas 70 remaining in inner chamber 20 to minimize return force.

Venting structure 80 would include both a venting pathway 82 and a structure, for example a valve 84, for controlling the operation of venting pathway 82 that leads out of device 10 at a suitable point, which purely by example may be located adjacent the forward end of device 10 and near counterforce-generating member 60. It is not desirable or for that matter even possible for venting pathway 82 to be open and operational during all phases of the retraction and extension strokes. As to the retraction stroke having it open all the time would dramatically dilute the effect of transferring the compressed gas 70 during the retraction stroke to the outer chamber 30 with all of its useful stored energy for later use during the extension stroke. As to the extension stroke, leaving the venting pathway 82 open during the stroke would dramatically dilute the effect of the compressed gas 70 directing its force against piston 40 to accelerate it backwardly.

Valve 84, which may be a spool valve, a poppet valve or any other suitable valve, extends from and is connected to counterforce-generating member 60. Valve o-rings seal the flow of any gas 70 from inner chamber 20 into venting pathway 82 until it is desired to make use of the venting pathway 82. As best seen in FIGS. 1A–1C, in the case of a spool valve 84, valve clearance 82b is controlled by valve 84. Once sealing structure 50 seals the flow of gas 70 and compressed air 70 is isolated out of inner chamber 20, counterforce-generating member 60 is then sufficiently compressed and urged toward the forward end of device 10 so that the valve clearance 82b regulated by spool valve 84 is in communication with the first leg 82a of venting pathway 82 which leads from inner chamber 20 to the valve clearance 82b surrounding spool valve 84. Since valve clearance 82b surrounding spool valve 84 is in communication with the third leg 82c of venting pathway 82 which third leg 82c is in communication with the outside area external to device 10, a complete venting pathway 82 is created between inner chamber 20 and areas external to device 10. For example, venting pathway 82 can terminate at an end of the device 10 adjacent counterforce-generating member 60, as seen in FIGS. 1A–1C. Valve 84 is designed so that venting pathway 82 is fully open from just beyond the point in time when gas 70 coming through aperture 33 is sealed off by sealing structure 50 through the point in time when counterforce-generating member 60 is fully compressed at the completion of the retraction stroke and continuing through the beginning of the extension stroke until just prior to the point in time when sealing structure 50 allows the flow of compressed air 70 to resume from outer chamber 30. Accordingly, high pressure is prevented from building up in inner chamber 20 at the end of the retraction stroke and the beginning of the extension stroke without diluting the effectiveness of other features of the device 10.

One method by which valve 84 controls the compression of counterforce-generating member 60 so that it is coordinated properly with the action of piston 40 is that valve 84 includes narrow valve member 85 extending toward piston 40 and narrow valve member 85 is struck by piston 40 during the completion of the retraction stroke as piston 40 is fully extended. Alternatively, instead of narrow valve member 85, piston 40 itself can have a narrow ram actuator jutting out of the forward end of piston 40 that strikes valve 84. It should be noted that in this patent application the phrase "fully extended" means the furthest forward position that piston 40 takes during the retraction stroke and is not referring to the "extension stroke". In this patent application, the term "narrow" as used in the phrases "narrow valve member" and "narrow ram actuator" means having a small diameter.

Figure 1D:
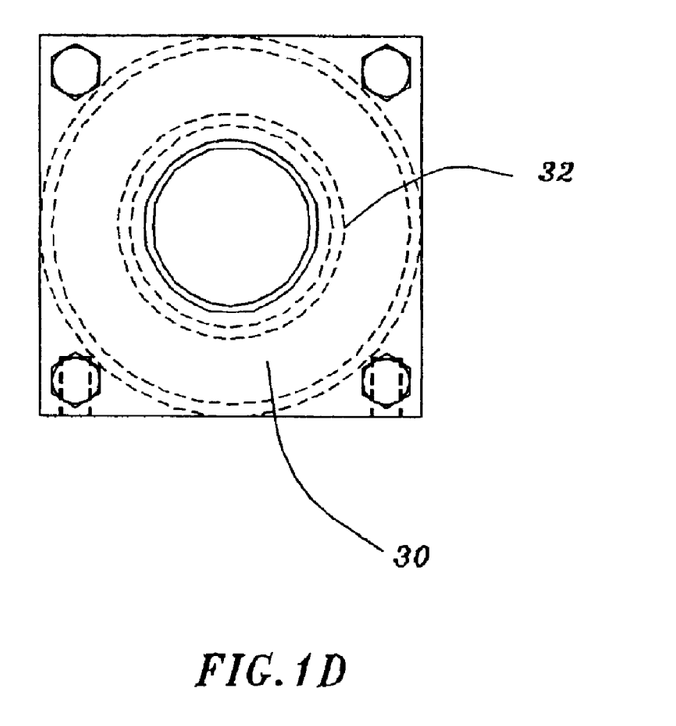
FIG. 1D is an end view of the device of FIG. 1A taken along line D—D of FIG. 1A.
Figure 2:
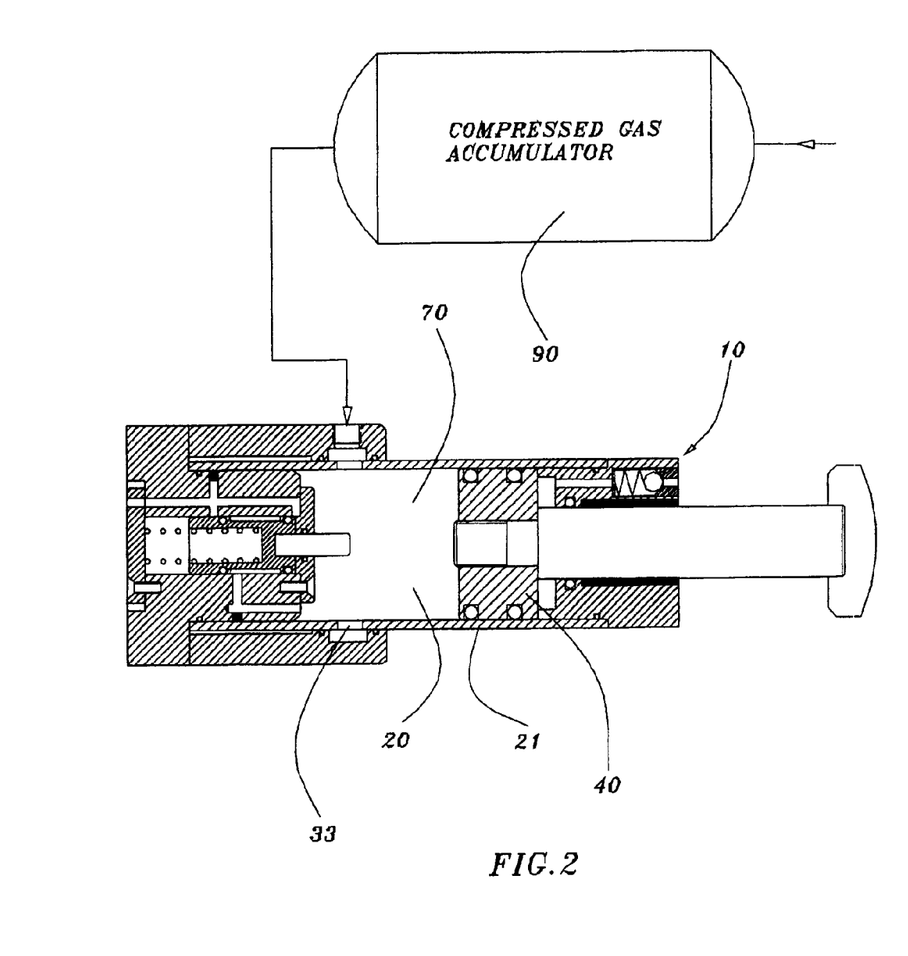
FIG. 2 is an alternative embodiment showing the source of compressed air external to the device of the present invention.

FIG. 1D is a view that depicts the device 10 of FIG. 1A–1C from the end and is taken along line D—D of FIG. 1A.

It should be noted that it is desirable and common for there to be a timed interval between the completion of the retraction stroke and the initiation of the extension stroke. The length of the interval is preset to address whatever the machine part that device 10 function in needs to perform. Accordingly, the fact that device 10 allows the extension stroke to occur automatically with the removal of the external weight—or other source of the kinetic energy—acting against the piston 40 is an important advantage of device 10. It is not just that device 10 allows the extension stroke to occur automatically but that the extension stroke occurs automatically after a preset time interval whose length is set by the user. The energy from the retraction stroke which had been isolated is stored by device 10 until the preset time interval has elapsed and the extension stroke is allowed to proceed and the extension stroke proceeds using this stored energy. The device 10 thus provides enormous energy savings and control to the user and combines a shock absorber and accelerator into one device.

As seen in FIG. 2, the first alternative embodiment of device 10 is essentially identical to the main embodiment heretofore discussed except that in this alternative there is no outer storage chamber and there is an external source of compressed gas outside device 10. Accordingly, inner chamber 20 includes an outer wall 21 having aperture 33 defined therein for continual communication with an external source of compressed gas 70 rather than for communication with outer storage chamber 30. There is a minimal clearance between piston 40 and outer wall 21, as described in connection with the main embodiment. Piston 40, upon the exertion of a force against piston rod 44, moves through and compresses gas 70 in inner chamber 20 and drives gas 70 through aperture 33 to the external source 90 of compressed gas 70. External source 90 can be anything suitable for storing such gas 70, such as an external accumulator (which may be connected to a compressor).

Figure 3A:
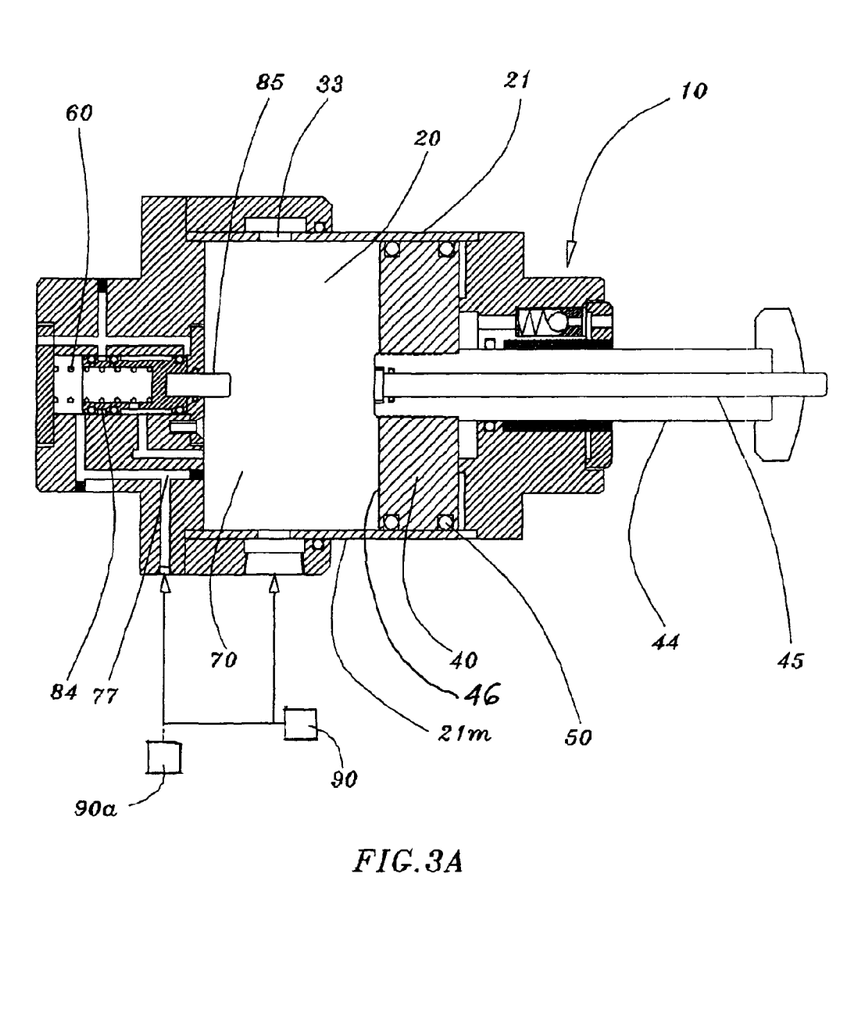
FIG. 3A is a sectional view of an alternative embodiment of the shock absorber and accelerator of the present invention in its initial position.
Figure 3B:
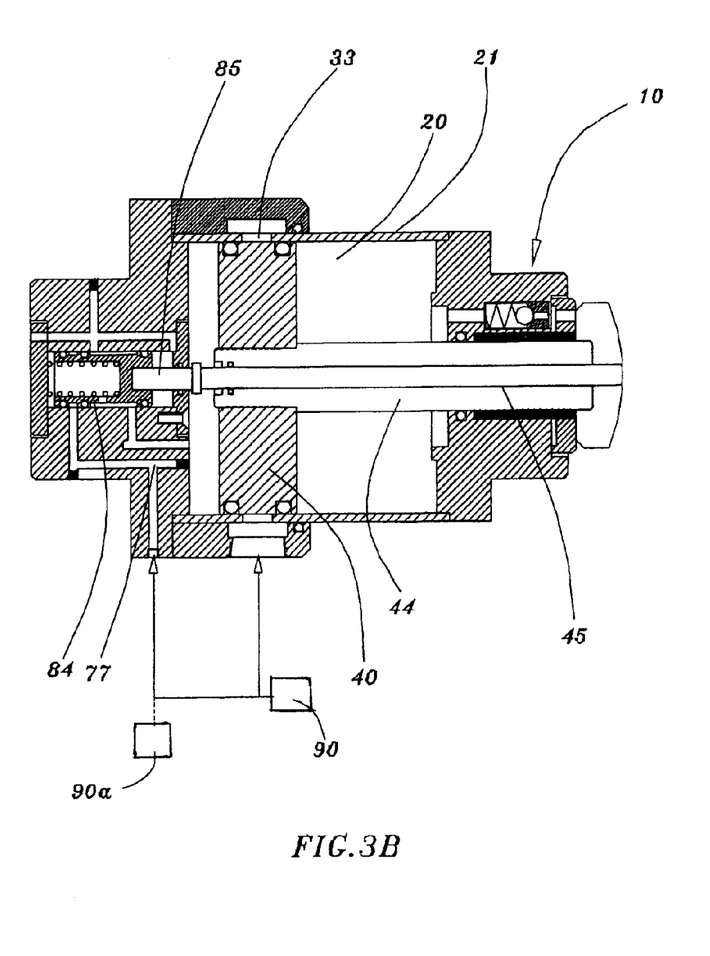
FIG. 3B is a sectional view of the device of FIG. 3A in its final position of the retraction stroke.
Figure 3C:
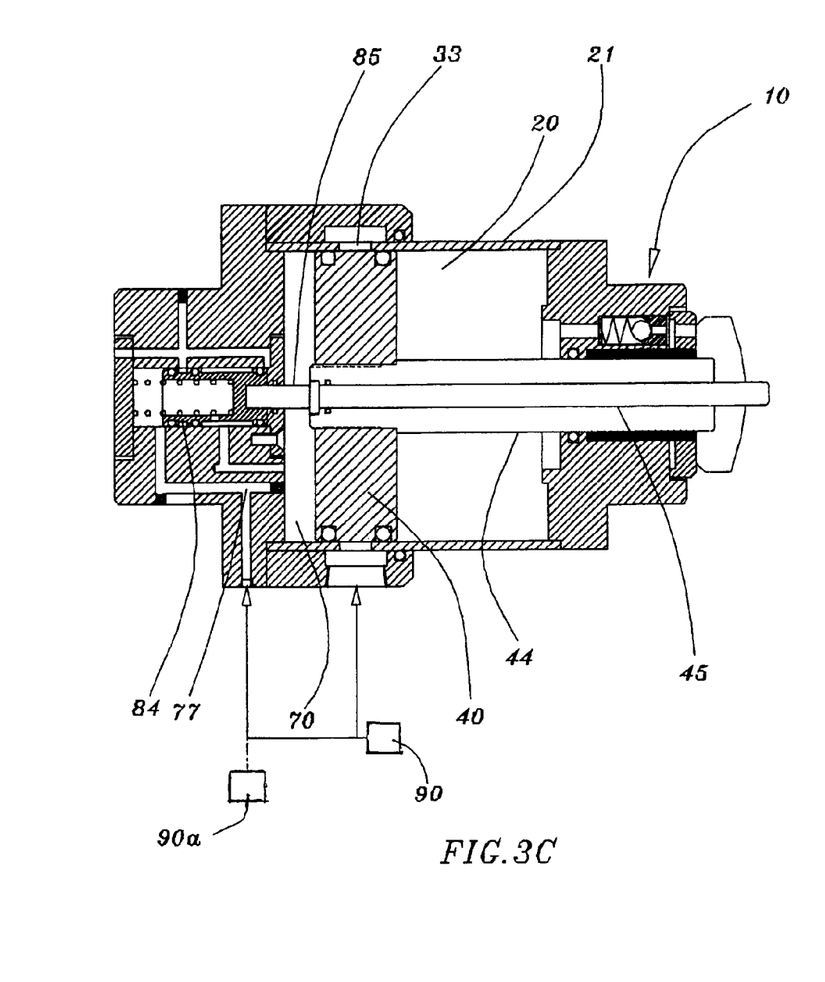
FIG. 3C is a sectional view of the device of FIG. 3A in an intermediate position of the extension stroke.

As stated, device 10 is a powerful shock absorber and accelerator. Device 10 can be made even more powerful, however, by a design variation described below. As seen in FIGS. 3A, 3B and 3C, in a further variation of the alternative embodiments shown in FIG. 2 designed to create an even more powerful shock absorber and accelerator, the alternative embodiment having a source of compressed air 70 external to device 10 can be further modified by certain design changes.

The stopping and accelerating force of a shock absorber and accelerator is proportional to its area and the pressure. In order to increase the stopping and accelerating force of device 10, the cross-sectional area of piston 40 can be increased along with increasing the diameter of a midsection 21m of outer wall 21 of inner chamber 20. Doing so has the drawback of increasing friction which is proportional to the circumference of inner chambers 20 (or its perimeter if inner chamber 20 is not a cylinder) and hence also proportional to the cross sectional area of inner chamber 20. The modified design takes the advantage of the increased diameter of mid-section 21m and sidesteps the disadvantage as follows. To overcome friction two further design modifications are made.

As best seen in FIG. 3A, piston rod 44 includes a ram actuator 45 slidably disposed in and initially sticking out of a rear of the piston rod 44 at a beginning of a retraction stroke. Piston 40, upon the exertion of a force against the piston rod 44, moves through and compresses gas 70 in inner chamber 20 and drives gas 70 through aperture 33 but in this case movement of piston 40 begins when a force exerted against the ram actuator 45 causes ram actuator 45 to slide through and stick out of a forward end 46 of piston 40 (into which piston rod 44 extends) and become flush with (no longer sticks out of) the rear of the piston rod 44 whereupon that force is exerted against the piston rod 44 itself In the extension stroke, the reverse happens in that first ram actuator 45 is struck by valve 84, or narrow valve member 85 of valve 84, and then piston 40 is so struck. This allows the counterforce-generating member 60 to do less work until it gets assistance.

In other words, counterforce-generating member 60 and valve 84 are able to move before piston 40 starts to move. As a result, much less force is required to move counterforce-generating member 60 because it does not have to move the entire piston 40 but rather ram actuator 45 which has a smaller diameter.

The second design modification is that normally as a result of increasing the cross-sectional area of piston 40 the counterforce-generating member 60 would have to be enlarged to handle the greater force needed to sufficiently begin the extension stroke. Instead, counterforce-generating member 60 is maintained the same size or even made smaller. In this embodiment, after the counterforce-generating member 60 begins to move it automatically opens gas passage 77 that allows the flow of compressed gas to counterforce-generating member 60 and then to inner chamber 20. This assists counterforce-generating member 60 in moving the piston the initial distance so that sealing structure 50 no longer seals off compressed gas 70 but that is only after counterforce-generating member 60 has moved the ram actuator 45 of piston rod 44 through the piston 40 so that ram actuator becomes flush with forward end of piston 40 (as it was at the beginning of the retraction stroke). After that, stored compressed gas 70 flows from external source 90 of compressed gas 70 to inside chamber 20 to fully execute extension stroke.

Gas passage 77 is a passage from external source 90 of compressed gas to counterforce-generating member 60 inside device 10 for conveying compressed gas 70 to counterforce-generating member 60 after the counterforce-generating member 60 has begun to move in order to help the counterforce-generating member 60 move the piston 40 the above-mentioned initial distance. The present invention also contemplates in this embodiment the possibility that the external source of gas that gas passage 77 begins from is not the same as external source 90 (which supplies gas 70 to inner chamber 20 during the retraction stroke) but is rather a different external source 90a.

Figure 4:
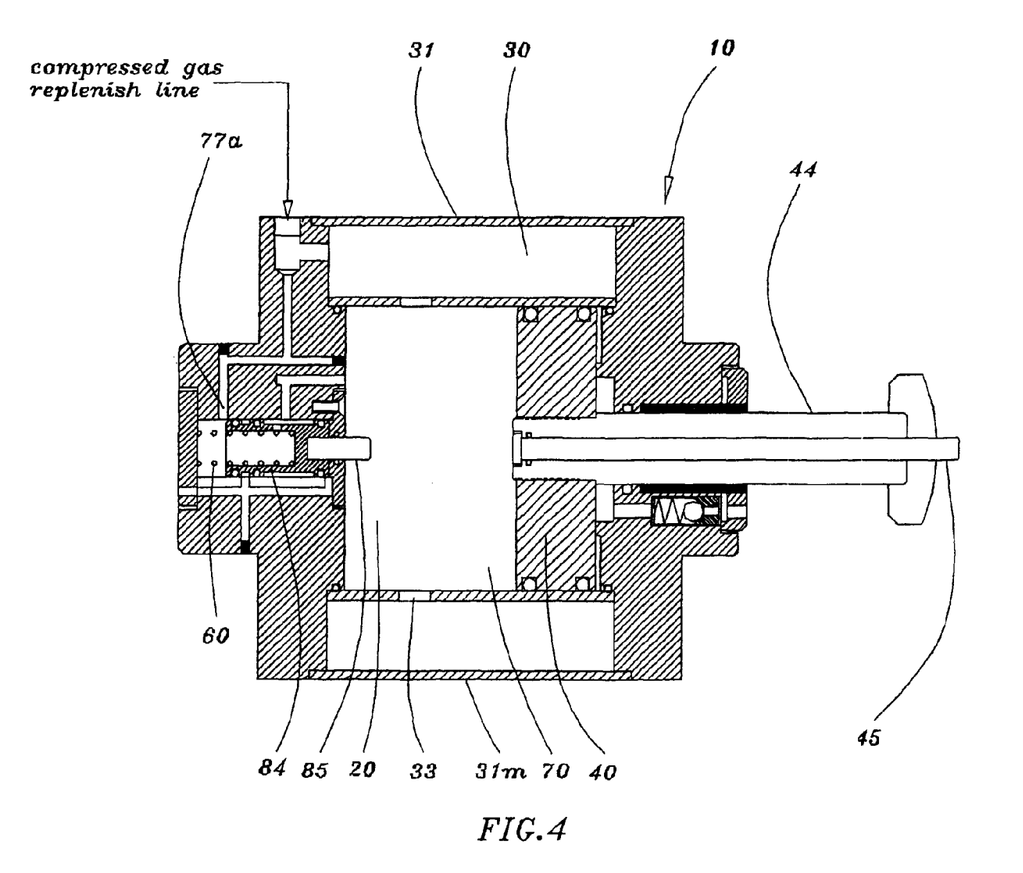
FIG. 4 is a sectional view of an embodiment that combines the features of the embodiment of FIGS. 1A–C with the modifications of the embodiment shown in FIG. 3.
Figure 5:
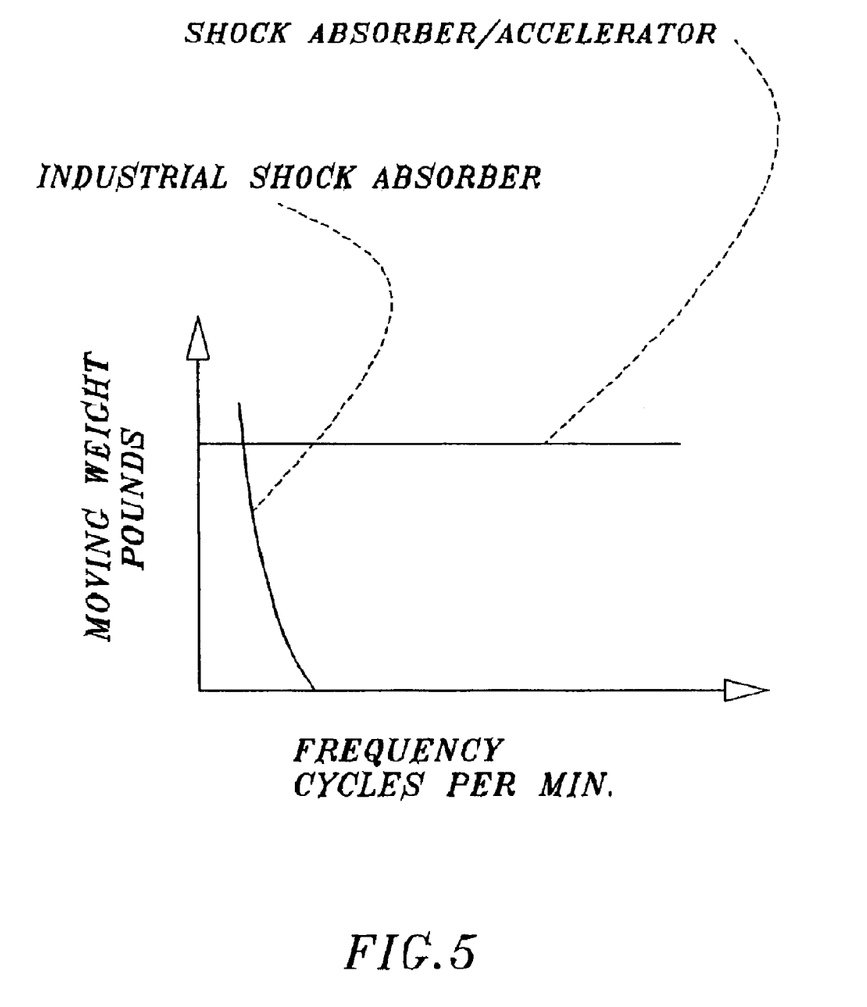
FIG. 5 is a graph that depicts a comparison between the weight moved by a device of the present invention at high frequency and a weight moved by a comparably sized industrial shock absorber at high frequency.

As seen in FIG. 4, the embodiment depicted in FIGS. 1A–1C can also be similarly modified to make it more powerful. In such a case, outer storage chamber 30 also has outer storage chamber outer wall 31 that has wide midsection 31m. Piston rod 44 includes ram actuator 45 slidably disposed in and initially sticking out of a rear of the piston rod 44 at a beginning of a retraction stroke. Piston 40, upon the exertion of a force against the piston rod 44, moves through and compresses gas 70 in inner chamber 20 and drives gas 70 through aperture 33 to outer storage chamber 30. Movement of piston 40 begins when a force exerted against the ram actuator 45 causes ram actuator 45 to slide through and stick out of piston 40 and become flush with (no longer sticks out of) the rear of piston rod 44 whereupon the force is exerted against piston rod 44. The retraction stroke is completed when ram actuator 45 of piston 40 is fully extended. Counterforce-generating member 60 is for moving ram actuator 45 through piston 40 and opening gas passage 77a. When counterforce-generating member moves it automatically opens gas passage 77a that allows the flow of compressed gas 70 to counterforce-generating member 60. The gas 70 plus the counterforce-generating member 60 are then able to move piston 40 the initial distance to initiate the extension stroke, the initial distance being sufficient so that compressed gas 70 from outer storage chamber 30 rushes in to the inner chamber 20 thereby greatly accelerating piston 40 for a remainder of the extension stroke. In this embodiment, gas passage 77a is a passage from outer chamber 30 to counterforce-generating member 60 for conveying compressed gas 70 to counterforce-generating member 60 after counterforce-generating member 60 has begun to move in order to help the counterforce-generating member 60 move piston 40 the above-mentioned initial distance (after ram actuator 45 has moved through piston 40 to become flush with forward end of piston 40).

In general, with respect to all the embodiments, because of the isolation of the stored energy inherent in the compressed gas 70 from the inner chamber 20 and venting structure 80, device 10 achieves an unusually low return force and one that is significantly lower, by a factor of up to five times less, than the maximum allowable return force required for a comparably sized industrial shock absorber. A high degree of safety is achieved by the venting structure 80 and by the sealing which occurs prior to the completion of the retraction stroke. Due to the stored energy of the retraction stroke (deceleration) being used during the extension stroke (acceleration) and due also to the avoidance of heat dissipation and the achievement of a substantially uniform level of force throughout the retraction and extension strokes, a large energy savings is achieved of up to 85% compared to a comparable sized industrial shock absorber. Furthermore, due to the inclusion in device 10 of the acceleration feature, a much lower propelling energy—up to 18 times less than a comparably sized industrial shock absorber—is needed to operate the device 10. Moreover, an unprecedented high absorbed and released energy capacity—up to one billion inch-pounds per hour—is achieved. Due to the avoidance of heat dissipation, device 10 can also be used at extremely high frequencies of up to 15,000 cycles per hour and much heavier weight can be moved by device 10 at a given high frequency than comparably sized industrial shock absorbers. The graph shown in FIG. 5 demonstrates the much higher moving weight achieved at high frequency compared to a comparably size industrial shock absorber. It should be noted that the quantities stated in the comparisons mentioned in this paragraph are estimates.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A powerful shock absorber and accelerator device, comprising:

an inner chamber containing a gas, an outer storage chamber for containing compressed gas, the outer storage chamber having an outer storage chamber outer wall that has a wide midsection, an inner wall defining a boundary between the outer storage chamber and the inner chamber, the inner wall having an aperture defined therein, a piston and a piston rod, there being a clearance between the piston and the inner wall, the piston rod including a ram actuator slidably disposed in and initially sticking out of a rear of the piston rod at a beginning of a retraction stroke, the piston, upon the exertion of a force against the piston rod, moving through a retraction stroke and compressing gas in the inner chamber and driving the gas through the aperture to the outer storage chamber, movement of the piston beginning when a force exerted against the ram actuator causes the ram actuator to slide through and stick out of a forward end of the piston and become flush with the rear of the piston rod whereupon the force is exerted against the piston rod, a sealing structure that seals the clearance so that when the piston moves through a portion of the inner chamber during an intermediate phase of a retraction stroke the aperture is sealed, the aperture staying sealed during a remainder of the retraction stroke, a counterforce-generating member, a gas passage from the outside chamber to the counterforce-generating member, the counterforce-generating member for moving the ram actuator through the piston and for opening the gas passage to allow flow of compressed gas that moves the piston an initial distance to initiate an extension stroke, said initial distance being sufficient to release the sealing of the aperture, the piston, upon the release of the sealing of the aperture, being accelerated for a remainder of the extension stroke by compressed gas that rushes in from the outer storage chamber to the inner chamber, and the gas passage for conveying compressed gas to the counterforce-generating member after the counterforce-generating member has begun to move in order to help the counterforce-generating member make the ram actuator slide through the piston and move the piston the initial distance, and a venting pathway from the inner chamber to an area external to the device for venting gas in the inner chamber at approximately the completion of the retraction stroke.

2. The device of claim 1, including a valve for controlling the venting pathway, the valve extending from and connecting to the counterforce-generating member.

3. The device of claim 1, wherein the aperture is situated as close to a point of a completion of the retraction stroke as possible while still being situated, so that additional movement of the piston can occur during the retraction stroke after the sealing of the clearance.

4. The device of claim 1, wherein the venting pathway terminates at an end of the device adjacent the counterforce-generating member.

5. The device of claim 1, wherein the aperture is substantially perpendicular to a direction of the retraction stroke and is large enough to minimally restrict a flow of compressed gas.

6. The device of claim 1, wherein the aperture is substantially annular and is substantially perpendicular to a direction of the retraction stroke.

7. The device of claim 1, wherein the sealing structure comprises at least two o-rings located on the piston.

8. The device of claim 1, wherein the inner chamber and the outer storage chamber are cylindrical.

9. The device of claim 1, wherein the gas is air.

10. The device of claim 1, wherein the gas is nitrogen.

11. The device of claim 1, wherein the valve includes a narrow valve member that is struck by the piston during a completion of the retraction stroke.

12. The device of claim 1, wherein the valve is a spool valve.

13. The device of claim 1, wherein the valve is a poppet valve.

* * * * *